US009351183B2

(12) United States Patent
Bellamkonda et al.

(10) Patent No.: US 9,351,183 B2
(45) Date of Patent: May 24, 2016

(54) APPARATUS AND METHOD FOR MEASURING AND USING CONGESTION IN A WIRELESS COMMUNICATION SYSTEM

(71) Applicant: Google Technology Holdings LLC, Mountain View, CA (US)

(72) Inventors: Krishna K. Bellamkonda, Lake Zurich, IL (US); Joseph F. Cramer, Woodstock, IL (US); Jitesh R. Nair, Cedar Park, TX (US); Bryan S. Nollett, Fox River Grove, IL (US); Nischal Y. Patel, Gilberts, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 126 days.

(21) Appl. No.: 13/776,750

(22) Filed: Feb. 26, 2013

(65) Prior Publication Data

US 2014/0242916 A1 Aug. 28, 2014

(51) Int. Cl.
*H04W 48/00* (2009.01)
*H04W 24/08* (2009.01)
*H04L 12/801* (2013.01)
*H04L 12/825* (2013.01)

(52) U.S. Cl.
CPC .............. *H04W 24/08* (2013.01); *H04L 47/11* (2013.01); *H04L 47/12* (2013.01); *H04L 47/14* (2013.01); *H04L 47/263* (2013.01)

(58) Field of Classification Search
USPC ........ 455/67.11, 414.3, 512, 414.1, 433, 445, 455/450, 449, 447, 427, 452.2, 456.1; 370/229, 241, 235, 230, 232, 252, 328, 370/237, 236, 468, 338, 395.6
See application file for complete search history.

(56) References Cited

U.S. PATENT DOCUMENTS 6,594,246 B1 7/2003 Jorgensen
6,684,076 B2 * 1/2004 McKenna ............. H04W 24/00
455/445

(Continued)

FOREIGN PATENT DOCUMENTS

WO 02/19654 A2 3/2002
WO 2006/075951 A1 7/2006

(Continued)

OTHER PUBLICATIONS

European Patent Office, International Search Report and Written Opinion for PCT Application No. PCT/US2014/012679, mailed May 26, 2014.

*Primary Examiner* — Ganiyu A Hanidu
(74) *Attorney, Agent, or Firm* — Faegre Baker Daniels LLP (57) ABSTRACT

A method and apparatus are for receiving a set of individual congestion reports, wherein each individual congestion report comprises a set of congestion values and an associated location. Each individual congestion report has been generated by one of a plurality of user devices operating in a wireless communication system and is based on at least one of a downlink congestion value, an uplink congestion value, and a core congestion value. The set of individual congestion reports is correlated to form one or more local congestion reports. One or more local congestion reports are transmitted to a user device. Additionally or alternatively, user device application interactions with a user device are altered based on the one or more local congestion reports. Additionally or alternatively, network performance parameters are altered to reduce congestion in at least on region based on one or more local congestion reports.

15 Claims, 9 Drawing Sheets

(56) References Cited

U.S. PATENT DOCUMENTS

| | | | |
|---|---|---|---|
| 8,254,368 B2* | 8/2012 | Huber | G06Q 20/1235 370/310 |
| 8,483,701 B2 | 7/2013 | Monnes et al. | |
| 8,953,329 B1* | 2/2015 | Heydari | 361/732 |
| 2002/0152305 A1* | 10/2002 | Jackson | H04L 12/26 709/224 |
| 2005/0136943 A1* | 6/2005 | Banerjee | H04B 1/7115 455/456.1 |
| 2007/0076621 A1* | 4/2007 | Malhotra et al. | 370/252 |
| 2009/0150480 A1* | 6/2009 | Xia | H04L 65/602 709/203 |
| 2009/0150570 A1* | 6/2009 | Tao | H04L 67/06 709/249 |
| 2010/0190447 A1* | 7/2010 | Agrawal et al. | 455/63.1 |
| 2010/0227636 A1* | 9/2010 | Kwon | H04W 74/0875 455/512 |
| 2010/0278042 A1* | 11/2010 | Monnes et al. | 370/230 |
| 2011/0096665 A1* | 4/2011 | McCann et al. | 370/235 |

FOREIGN PATENT DOCUMENTS

| | | |
|---|---|---|
| WO | 2006/091137 A1 | 8/2006 |
| WO | 2012/125478 A1 | 9/2012 |

* cited by examiner

┌─────────────────────────────────────────────────┐
│ DETERMINE AT LEAST ONE OF A SCHEDULING REQUEST  │
│ BURDEN, AN UPLINK BUFFER EXTINGUISH RATE, A DOWNLINK │ — 605
│ HYBRID AUTOMATIC REPEAT REQUEST (HARQ) FAILURE RATE, │
│ AND A CLOSED LOOP UPLINK TRANSMIT ADJUSTMENT    │
│ ACCUMULATION INDEX                              │
└─────────────────────────────────────────────────┘
                        ↓
┌─────────────────────────────────────────────────┐
│ USE THE SCHEDULING REQUEST BURDEN, THE UPLINK   │
│ BUFFER EXTINGUISH RATE, THE DOWNLINK HYBRID     │
│ AUTOMATIC REPEAT REQUEST (HARQ) FAILURE RATE, AND │ — 610
│ THE CLOSED LOOP UPLINK TRANSMIT ADJUSTMENT      │
│ ACCUMULATION INDEX TO FORM AN UPLINK CONGESTION │
│ VALUE                                           │
└─────────────────────────────────────────────────┘

┌─────────────────────────────────────────────────┐
│ DETERMINE A DIFFERENCE IN A QUANTITY OF TRANSMITTED │
│ UPLINK REQUESTS FOR MORE BANDWIDTH RESOURCES AND │
│ A QUANTITY OF RECEIVED UPLINK BANDWIDTH GRANTS, │ — 705
│ DURING A DEFINED TIME PERIOD ASSOCAITED WITH THE TIME │
│ OF THE DETERMINATION OF THE SCHEDULING REQUEST  │
│ BURDEN                                          │
└─────────────────────────────────────────────────┘

┌─────────────────────────────────────────────────┐
│ DETERMINE A RATIO OF (BYTES GRANTED BY BANDWIDTH │
│ UPLINK GRANTS) TO (OUTSTANDING BYTES AWAITING   │
│ TRANSMISSION IN AN UPLINK TRANSMISSION BUFFER)  │ — 805
│ DURING A DEFINED TIME PERIOD ASSOCIATED WITH THE TIME │
│ OF THE DETERMINATION OF THE UPLINK BUFFER       │
│ EXTINGUISH RATE                                 │
└─────────────────────────────────────────────────┘

DETERMINE A RATIO OF DUPLICATE DOWNLINK ACKNOWLEDGEABLE DATA LINKS TO GOOD DOWNLINK ACKNOWLEDGEABLE DATA UNITS RECEIVED DURING A DEFINED TIME PERIOD ASSOCIATED WITH THE TIME OF THE DETERMINATION OF THE UPLINK ACKNOWLEDGEMENT FAILURE RATE. — 905

ACCUMULATE A NET AMOUNT OF ONE OR BOTH OF CLOSED LOOP POWER CORRECTIONS AND CLOSED LOOP LARGE TIMING ADJUSTMENTS ON AN UPLINK CHANNEL THAT IS POWER CONTROLLED BY THE WIRELESS COMMUNICATION SYSTEM DURING A DEFINED TIME PERIOD ASSOCIATED WITH THE TIME OF THE DETERMINATION OF THE CLOSED LOOP UPLINK ADJUSTMENT ACCUMULATION INDEX. — 1005

MONITOR REPETITIVE RESPONSIVE NETWORK EVENTS AND DETERMINE AN AVERAGE ROUND TRIP TIME (RTT) OF THE REPETITIVE RESPONSIVE NETWORK EVENTS DURING A DEFINED TIME PERIOD ASSOCIATED WITH THE TIME OF THE DETERMINATION OF THE CORE NETWORK CONGESTION — 1100

┌─────────────────────────────────────────┐
│ RESCHEDULE A DELIVERY OF APPLICATION INFORMATION TO │
│ A USER DEVICE FROM A FIRST TIME TO A SECOND TIME,   │─ 1505
│ BASED ON A PREDICTION THAT THE USER DEVICE WILL BE  │
│ WITHIN THE LOCALE OF A LOCAL CONGESTION REPORT      │
│ HAVING A HIGH SUMMARY CONGESTION VALUE AT THE FIRST │
│ TIME                                                │
└─────────────────────────────────────────┘

┌─────────────────────────────────────────┐
│ ALTER HANDOFF PARAMETERS IN A MANNER DESIGNED TO    │
│ CAUSE ONE OR MORE USER DEVICES OPERATING IN A       │─ 1605
│ CONGESTED CELL TO OPERATE IN AN ADJACENT CELL THAT  │
│ IS LESS CONGESTED                                   │
└─────────────────────────────────────────┘

┌─────────────────────────────────────────┐
│ CONTROL ONE OR MORE TCP CHARACTERISTICS OF ONE OR   │─ 1705
│ MORE TCP SOCKETS THROUGH WHICH APPLICATION          │
│ INFORMATION IS BEING TRANSFEERED                    │
└─────────────────────────────────────────┘

*FIG. 17*

APPARATUS AND METHOD FOR MEASURING AND USING CONGESTION IN A WIRELESS COMMUNICATION SYSTEM

FIELD OF THE INVENTION

The present invention relates generally to wireless networks, and more specifically to improving application performance in user devices of wireless networks.

BACKGROUND

When a cellular system client device (hereafter, a user device) is within operational range of a base station of a wireless network, and is provided access to the network by the base station via a radio link, the ability of the radio link to provide satisfactory service to the user of the user device is subject to many factors. Generally, when the user device is operating in lightly loaded conditions, that is when the amount of voice and data information being transferred between the base station and all of the user devices that are simultaneously linked to the base station is low compared to a designed maximum load (i.e., a designed maximum amount of data and voice information), then satisfactory or better than satisfactory service can typically be provided to the user device and most of the other user devices. Providing satisfactory or better than satisfactory service in lightly loaded cells is subject in large part to degraded performance at the user device when it operates in locations that are in weak signal areas such as near cell limits in cellular wireless networks. The weak signal effect can sometimes be offset in lightly loaded conditions by increasing the power of the transmitting devices (base station and user device) of the radio link and granting more bandwidth to the radio link. These offsetting actions are sometimes performed dynamically—that is, during a communication session of a user device.

The performance of user devices in a cell tends to degrade as the cell loading increases, but cell loading by itself is not necessarily correlated to performance of a user device in a cellular system. Degraded performance in packet radio systems (which are representative of newer cellular systems) is sometimes directly correlated to higher instances of high packet latencies and reduced average data rates (reduced throughput). Since voice is now transported over packetized cellular systems, latencies of greater than 150 milliseconds are often used as one measure of adequate performance.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments that include the claimed invention, and explain various principles and advantages of those embodiments. The description is meant to be taken in conjunction with the accompanying drawings in which:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to devices and methods that predict performance issues (long packet latencies and lowered data rates) at particular locations in cellular systems by measuring an amount of congestion experienced by a user device, and using that measurement or a collection of such measurements from a plurality of user devices to provide improved system performance.

Figure 1:
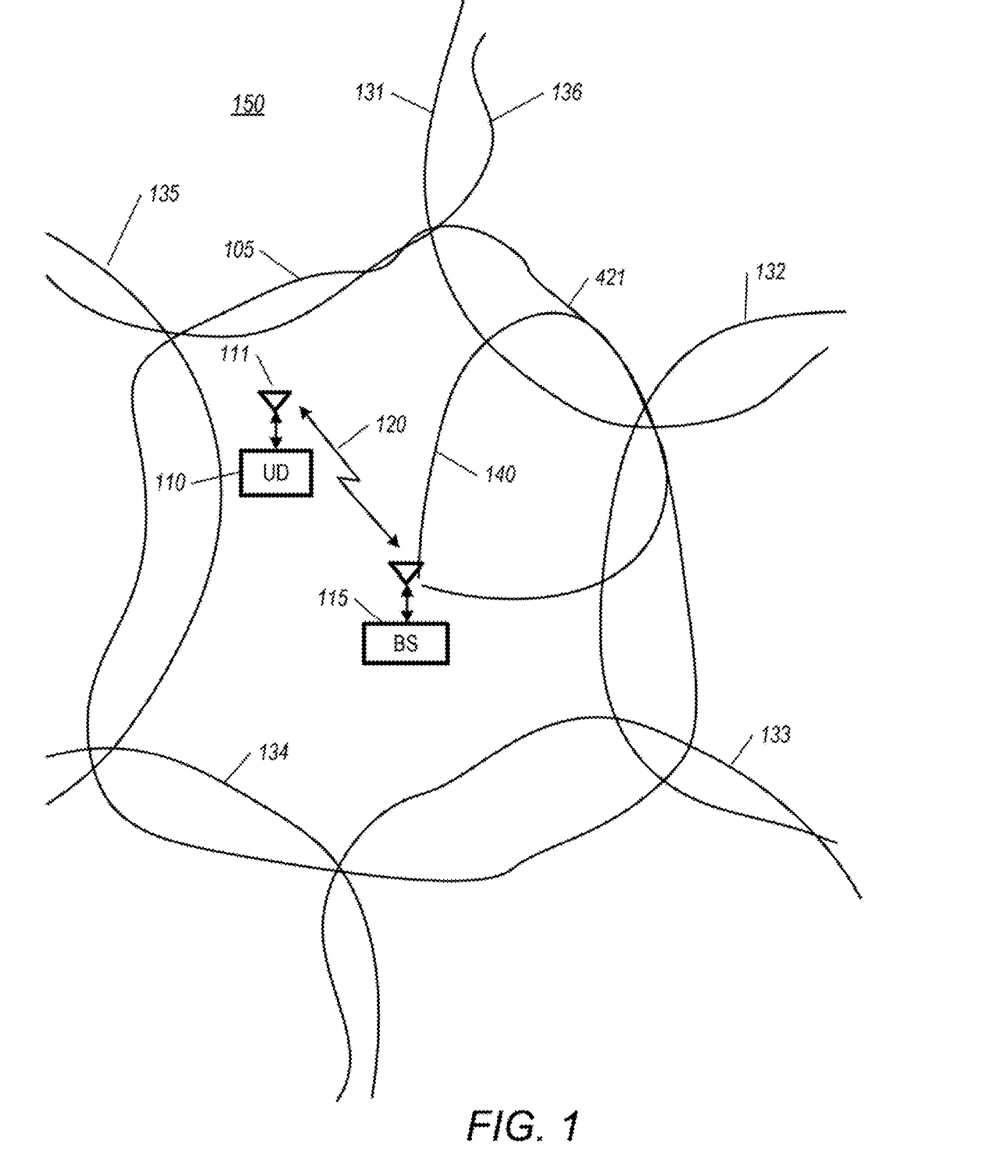
FIG. 1 Referring to FIG. 1, a topographical diagram 100 shows the boundary of a cell of a cellular network operated by a cellular provider, in accordance with certain embodiments.

Referring to FIG. 1, a topographical diagram 100 shows the boundary 105 of a cell of a cellular network 150 operated by a cellular provider, in accordance with certain embodiments. A user device 110 communicates with base station 115 of the cellular network 150 using radio link 120 when it is active and is sufficiently within the boundary 105. By means of the radio link 120 the user device is linked to the base station 115 and thereby coupled to the cellular network 150, and thereby may also be coupled to a network or networks connected to the cellular network, such as the world wide web and one or more private enterprise networks. The user device 110 is representative of a plurality, typically a large plurality (e.g., many hundreds when the system is heavily loaded) of wireless cellular devices that are using the cell having boundary 105 of the cellular network 150. The cellular network 150 includes a fixed network comprising the base station 115 as well as other fixed cellular network devices (typically a plethora of fixed network devices as varied as but not limited to base stations, antenna towers, base station controllers, back haul networks, authorized user data bases, monitoring systems, maintenance stations, customer billing servers, etc.). Some of the fixed cellular network devices may be devices that are not specifically owned by the cellular provider or whose physical location is unknown to the cellular provider, such as cloud server devices. The cellular network 150 may include or be connected to a server or servers or cloud storage devices that hold software applications that can be downloaded and used by the user devices such as web browsers, games, utilities, media handlers, navigation tools, etc. The base station 115 manages links that couple not only the user device 110 to the base station, but also a plurality of other user devices (not shown in FIG. 1). The user device 110 in this embodiment is a mobile device, which includes a radiating element 111 that may be a tuned antenna. The user device 110 could alternatively be any fixed, portable, or mobile wireless communication device, such as a cellular telephone, a tablet, a personal computer, or an instrument (e.g., a medial sensor, a location finder, a road side monitoring station) that has a capability to communicate to the network 150. The user device may be a fixed device in some embodiments. For example, it could be a device mounted on a post (stop light, road lighting, or sign) alongside a road. The coupling between the base station 115 and the user device 110 as described in examples herein is that used in 3GPP LTE (Long Term Evolution) systems defined by the 3GPP (3$^{rd}$ Generation Partnership Project) Technical Standards, series 36 (just three examples of these standards are 3GPP TS 36.213, TS 36.214, and TS 36.331). However, embodiments described herein may be equally usable or adaptable to other wide area wireless radio systems, such as UMTS (universal mobile telecommunication systems), UMB, CDMA2000, WiMax, WiFi, or other OFDM systems.

Also shown in FIG. 1 are parts of boundaries 131, 132, 133, 134, 135, 136 of cells that are adjacent to the cell that has boundary 105. These boundaries overlap so that user devices may connect to the network 150 using any one cell that is in the cellular network 150 and maintain connectivity to the cellular network 150 with an acceptable reliability. Also represented in FIG. 1 is a boundary 140 of one sector of the cell having boundary 105. In certain embodiments, a cell boundary is achieved by having multiple sectors whose boundaries overlap to provide a boundary such as boundary 105. In this drawing, the other sector boundaries that combine to define boundary 105 are not shown, for simplicity.

The grade of performance provided to a particular user device in embodiments of cellular systems that use packet data for information delivery may be evaluated in terms of packet latency and data rate. Latencies of less than 150 milliseconds are highly desirable when voice is conveyed using packet data, which is increasingly the technology that is used. Data rates are important for many types of information. In voice, intelligibility is degraded as data rates get lower. For compressed streaming video much higher data rates are needed than those for voice, and the resulting image quality degrades as the data rates degrade. Other information needs are not so sensitive to either latency or data rate; some files just take longer to be conveyed from a source to destination with necessary accuracy. The performance of these various packet based data services degrades as more information is transferred within the region of a cell by more user devices. There are mechanisms in today's cellular systems that ameliorate the degradations to packet services. These mechanisms involve dynamically controlling the bandwidth allocated to a link and the power allowed to the devices on each end of the link. As used herein, the bandwidth means a time average of both frequency and time resources allocated to a user device, and power means the transmit power allocated to a user device.

In spite of these mechanisms, as more information is transferred within the region of a cell by more user devices, performance tends to degrade. The degradation is caused by a number of factors: the bandwidth has to be shared by more devices; the power levels are constrained to reduce interference effects; inter-cell and intra-cell interference increases, and network core congestion causes detrimental effects such as dropped packets, thereby increasing duplicate transmissions. Due to these factors, data rates are lowered and latencies increased. These effects are not uniform across a cell. We describe these effects as resulting from congestion that occurs in a locale. This congestion, which is a consequence of the amount of information that is being transferred by the user devices in a locale, the closeness of the user devices (resulting in interference) in the locale, and the power of the signals in the links in the locale, can be quantified. In accordance with embodiments, the congestion is quantified by a user device at a particular location and a particular time. This information is conveyed by an individual congestion report to the cellular network 150 using very few resources. The network can then beneficially use this information immediately for dynamically modifying the communications to the user device and those of close by user devices by using that individual congestion report. For example, the network could make an application level determination that certain applications would be prioritized over others, even if they have similar data rate or latency requirements. For example, applications that can tolerate higher latencies and lower data rates could be prioritized over others in the same category. One example might be granting priority of data transfer for games that don't require quick responses over games that do, even though as games they may be in the same category of requested data rate and latency. Or, the network may modify existing rules for granting bandwidth and power for user devices operating in a locale of known high congestion. Additionally, the network can beneficially make application level determinations for user devices that can be predicted to be moving into areas of congestion from areas of less congestion, to increase data transfers while the user device in an area of lower congestion to offset a decrease that will be made when the user gets to a congested area.

Figure 2:
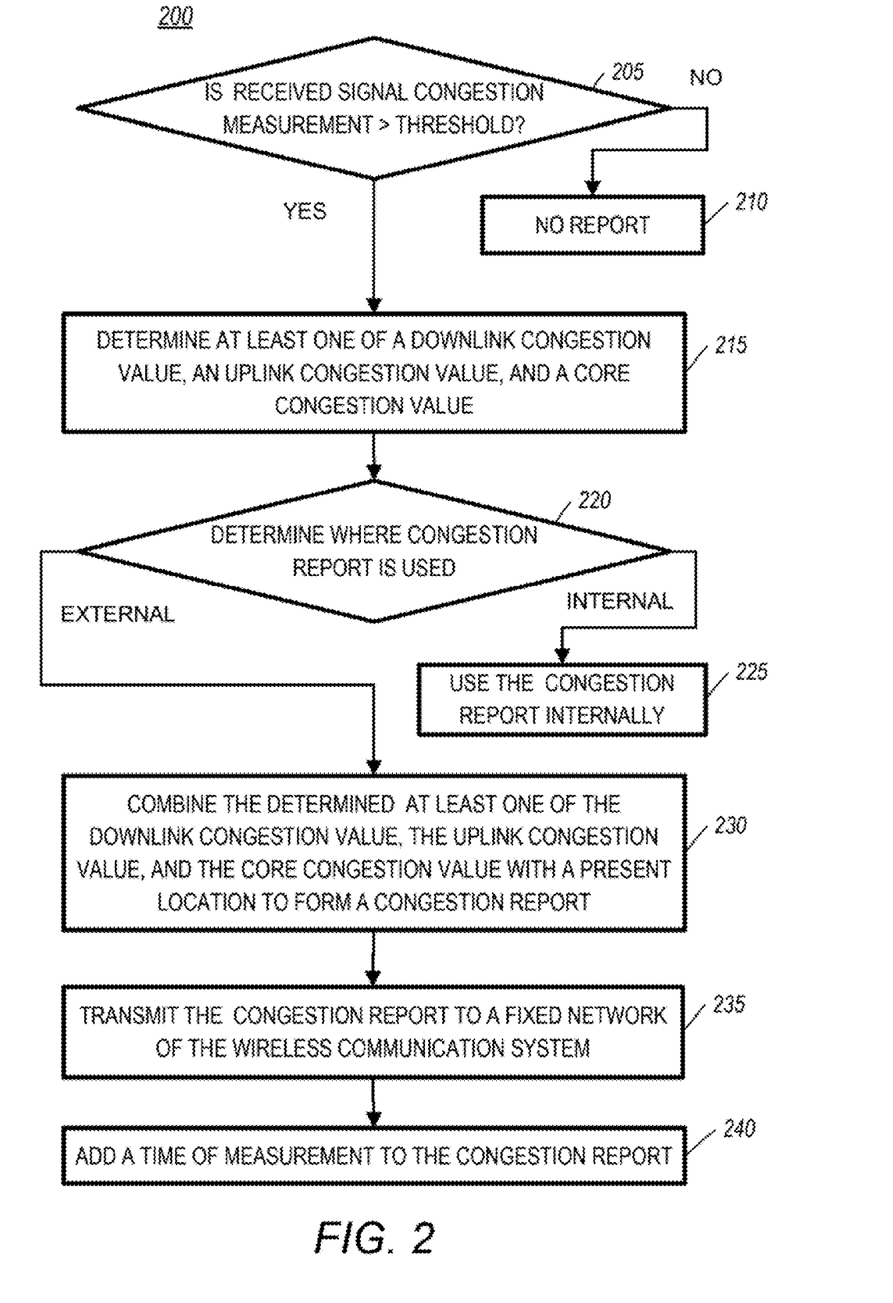
FIG. 2 is a flow chart that shows some steps of a method to provide a congestion report by a user device operating in a wireless communication system, in accordance with certain embodiments.

Referring to FIG. 2, a flow chart 200 shows some steps of a method to generate and provide an individual congestion report by a device operating in a wireless communication system, in accordance with certain embodiments. The method is described below as being performed in a user device, such as the user device 110 described with reference to FIG. 1. However, it will be appreciate that in some embodiments, the values used to generate an individual congestion report may be determinable by a network device, or a combination of network devices, or by the user device in combination with the network device(s), each determining some subset of the values used to generate the individual congestion report for the user device. For simplicity of wording, the term "device" will be used in the singular to represent a network device or net work devices or a combination of the user device and network device(s). The network may then send the individual congestion report or some portion of the individual congestion report to the user device which the user device could complete if the network is only sending a portion thereof an use the individual congestion report in those embodiments described below in which the user device uses the individual congestion report internally. Some embodiments may comprise self organizing networks (SONs) that comprise self organizing devices. In these networks, user devices may be the self organizing devices. Thus in these SONs, each user device may formulate an individual congestion report and participate in formulating a local congestion report from several individual congestion reports. The local congestion reports may then be shared with one or more of self organizing user devices. It will be appreciated that certain details described elsewhere herein pertain to the steps of this method. At step 205, a determination is made as to whether the user device is operating below a received signal congestion measurement threshold. When the mobile device is operating below the received signal congestion measurement threshold, a congestion report would be unreliable and one of several "no report" actions may be taken at step 210. For example, when the user device is tasked to provide repetitive individual congestion reports to the wireless network, the user device may transmit a null congestion report indicating that no reliable congestion information is available. In another example, wherein the user device makes individual congestion reports on an ad hoc basis, the user device may transmit nothing. When the user device is using the individual congestion reports internally, the user device may simply maintain a previous state based on a previous valid individual congestion report, awaiting a next valid congestion report.

When the mobile device is operating above the received signal congestion measurement threshold, a determination of at least one of a downlink congestion value, an uplink congestion value, and a core congestion value is made at step 215. Individual congestion reports may be used externally by the wireless communication system (or a network connected thereto) or internally by the user device itself, or both, depending on particular embodiments. Step 225 indicates internal uses, which are described in more detail below. Also or alternatively to step 225, the downlink congestion value, the uplink congestion value, and the core congestion value are combined and a present location of the user device may be added to form a individual congestion report at step 230, which is used for external uses In some embodiments, the downlink congestion value, the uplink congestion value, and the core congestion value are combined in manner that is very economical in the use of message resources. For example, the raw values for downlink congestion value, the uplink congestion value, and the core congestion value may be weighted with reference to each other and then each reduced to a two or four bit binary value for combination into one eight bit word for communication to the wireless communication network. This is described in more detail below. When the individual congestion report is used externally, the individual congestion report is transmitted at step 235 to the fixed network of the cellular communication system. In some embodiments, the user device includes the time of the determination of the combined congestion information at step 240. In other embodiments the network time stamps the individual congestion report when it is received, adding the time as a part of the individual congestion report, and step 240 is not used. In embodiments for which certain user devices are fixed devices and their location is known to the cellular network, or the location of a mobile device is established by other means by the cellular network, the location of the user device may not be provided by the user device in the individual congestion report when it is transmitted to the cellular network; the location is added by the cellular network to the individual congestion report. Thus, the step 230 of combining the present location with the other values by the user device is omitted in some embodiments.

The received signal congestion threshold is based on at least one of a signal to noise power ratio (SNR), a measured receive power of a reference signal, and a measured received signal strength (denoted as RSSI) of an information signal subject to interference from the other mobile devices. The reference signal is a narrow band signal that is transmitted periodically with characteristics defined by protocol specifications such that user devices know the timing, modulation, and power characteristics of the reference signal. In LTE systems these reference signals are referred to reference symbols. They may be referred to as pilot symbols or reference symbols in other wireless communication systems. The reference symbols received by a user device in LTE can be characterized as typically being subjected to less interference from signals transmitted by other user devices operating in adjacent cells than are information symbols that are received by the user device. This characteristic may also be true in other wireless communication systems. The benefits that result in other embodiments depend on the extent to which the reference signal is impacted by interference from other user devices that generate signal power within the bandwidth of the reference signal being used as a basis for the determination of the downlink congestion factor. The SNR as used in this document has the common meaning that it is the ratio of the signal plus noise plus interference to the noise plus interferences, and is often designated alternatively as SINR. The SNR may be determined in different ways in different models of user devices; the method to determine the SNR may not be specified in a system protocol specification for a particular wireless system. The method to determine the SNR is not presently specified in LTE system protocol specifications. In some LTE user devices, the received signal from which the SNR is determined is the reference signal.

In some embodiments, the measured received power of the reference signal is simply the average signal power of reference symbols. In an LTE embodiment it is defined as the RSRP (reference signal received power). In an LTE embodiment, the RSRP and RSSI are used to determine a value defined in the current issue of 3GPP TS 36.214 as RSRQ. From computer simulations of the operation of user devices in LTE cells for various loading levels (representing different congestion levels) technologists were able to define the received signal congestion threshold as being the logical AND of (SNR>2 dB), (RSRP>−110 dBm), and (RSRQ>−13 dB). In other words, when the value of any one of these signal measurements (SNR, RSRP, or RSRQ) falls below its respective threshold, the determination of congestion values for a individual congestion report using the techniques described herein below may not provide reliable results, so no congestion report is made or a congestion report is made that simply reports that the RF conditions are too poor to send a normal set of values. It will be appreciated that the threshold value used for the RSRQ value could be reduced to as low as −25 dB and increased up to −8 dB and the results may still provide benefits. Also, the SNR and RSRQ values could be independently changed by +−5 dB and the results may still provide benefits for a congestion report in an LTE system. The values used in this description have counterparts in other systems that could be used to provide the same benefits described herein, with thresholds adjusted to accommodate differences in measurement techniques. For example, the RSRP in LTE is comparable to the CPICH RSCP measurement used in UMTS, as defined in the 3GPP series of TS 25 standards. Signals denoted as pilot signals in some systems may be used to provide very similar information as the RSRP. SNR and RSSI could be measured by the user device in these communications systems. These three values could then be used to determine the threshold in a similar manner as described herein for an LTE system. In some embodiments, the threshold may be determined with sufficient reliability using only one or two of the three values described above. For example, in some embodiments, only SNR is used, while in another example, only SNR and RSRQ or its equivalent may be used. It will be further appreciated that the expression of the threshold can be modified without changing the underlying process (i.e., a congestion report is not made when a measured value is less than the values described above, or e.g. the values are expressed in base form (absolute power) instead of dB).

Figure 3:
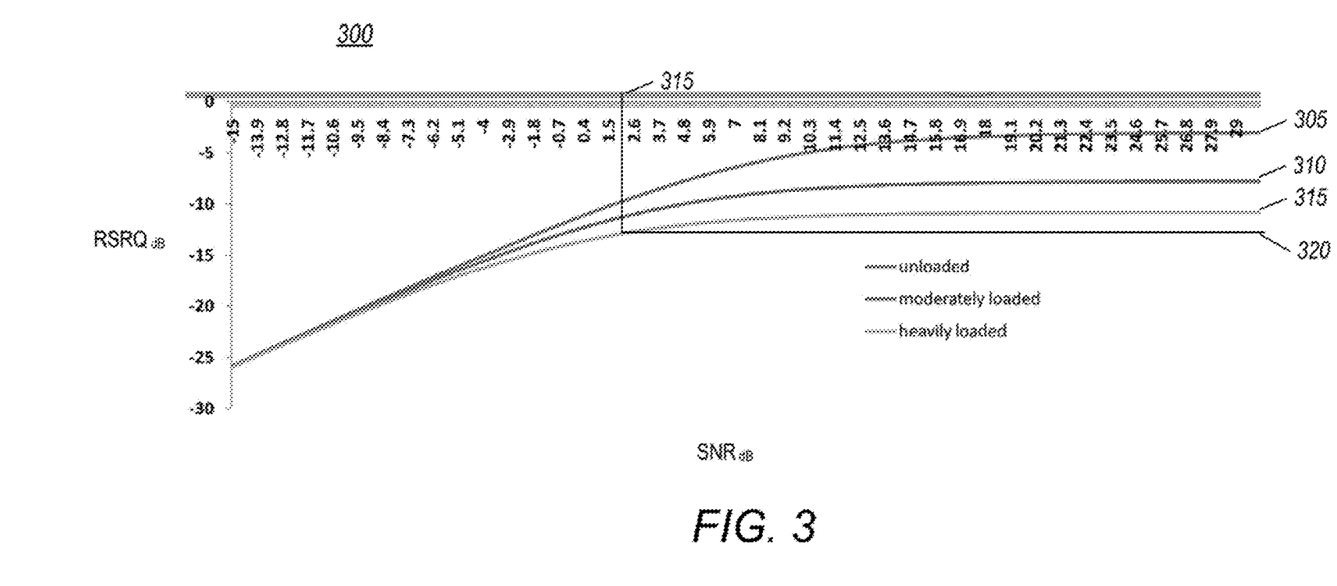
FIG. 3 is a plot that shows relationships between RSRQ (in dB) and SNR (in dB) for several particular congestion levels, in accordance with certain embodiments.

Referring to FIG. 3, a plot 300 shows relationships between RSRQ (in dB) and SNR (in dB) and congestion level, in accordance with certain embodiments. A formula for determining the congestion factor by combining the RSRQ and SNR was developed that provides congestion levels that are in the range of 0.167 to 1.0 when the energy being received in the information symbols varies from none to full power (full power being equal to the power being received by reference symbols). The formula provides other values that are outside this range that are not expected to occur under normal circumstances. Plots of the congestion value for a downlink channel operating under three different levels of congestion (unloaded 310, congestion factor=0.167; moderately loaded 320, congestion factor=0.5; and heavily loaded 330, congestion factor=1) are shown. In this formula, the particular loading was determined by using and noise energy and average received information energy. The formula was developed for the certain LTE systems, in terms of the RSRQ and SNR. This formula is described below with reference to FIG. 4. The same relationship may be advantageously used in other wireless systems with similar benefits described herein, particularly in those using OFDM (orthogonal frequency division multiplexing. Two of the threshold values used for invoking the use of the formula to determine a threshold value are shown in FIG. 3: threshold 315 which is at a SINR of 2 dB and threshold 320, which is at −13 dB. It will be appreciated that a similar relationship can be determined for other wireless communication systems based on the power levels of received information symbols, measured noise levels, and measured reference symbol power. In the embodiment described above a larger or smaller range of congestion factors could be used with similar benefits. For example an upper limit of 2 would be used without much change in results. Obviously, the congestion factor need not range from 0.167 to 1; it could scaled or transformed (e.g., logarithmically).

Figure 4:
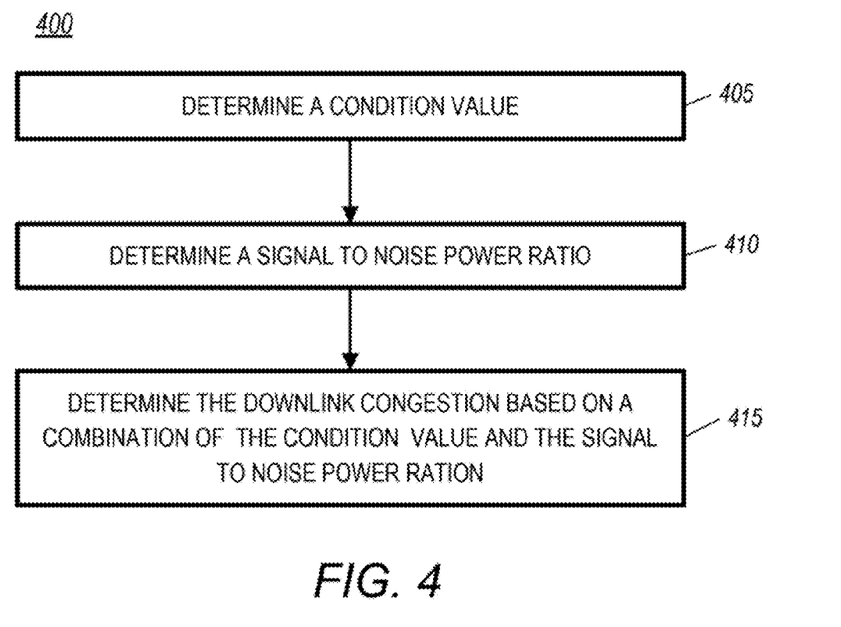
FIGS. 4-11 are flow charts that show some steps of the method described with reference to FIG. 2, in accordance with certain embodiments. The method is performed in a user device of a wireless communication system.

Referring to FIG. 4, a flow chart 400 shows some steps used to determine downlink congestion during step 215 of the method described with reference to FIG. 2, in accordance with certain embodiments. It will be appreciated that certain details described elsewhere herein pertain to these steps. At step 405, a condition value, CondVal, is determined. In LTE embodiments, the condition value is determined from the value RSRQ expressed in dB, which is denoted herein as $RSRQ_{dB}$. The CondVal for an LTE embodiment is determined as $10^{(-RSRQ_{dB}/10)}$. At step 410, the SNR is determined. At step 415, the downlink congestion value is determined based on a combination of the condition value and the SNR. For the LTE system and user devices being used as examples herein, the formula for combining the CondVal and SNR to obtain the downlink congestion value is $(1/12)*CondVal-10^{(-SNR_{dB}/10)}$, wherein $SNR_{dB}$ is the SNR expressed in dB. When the downlink congestion value is more than 0.167 and less than 0.5, for the system is deemed to be operating within a lightly loaded range. When the downlink congestion value is greater than or equal to 0.5 and less than 0.75, the system is deemed to be operating within a moderately loaded range, and when the downlink congestion value is greater than or equal to 0.75 and less than 1.0, the system is deemed to be operating in a heavily loaded range. In this model, downlink congestion values greater than 1.0 or less than 0.167 represent aberrations and are defined as being out-of bounds. The downlink congestion correlates reasonably well with an average downlink packet latency (i.e., the roundtrip time between the sending of a packet from the network to a user device and the receipt of the acknowledgement for the packet at the network), such that higher downlink congestion values correlate to higher latencies. In some embodiments, when the downlink value is to be combined with the other congestion values at step 215, the downlink congestion value is digitized to one of four binary values. In some embodiments, a lightly loaded range (0.167 to 0.5) of downlink congestion factor is given a binary value of 0; a moderately loaded range (0.5 to 0.75) of downlink congestion factor is given a binary value of 1; and a heavily loaded range (0.75 to 1.0) of downlink congestion factor is given binary value of 2. The out-of bounds values ([less than 0.167] and [greater than 1]] are given a binary value of 3.

Figure 5:
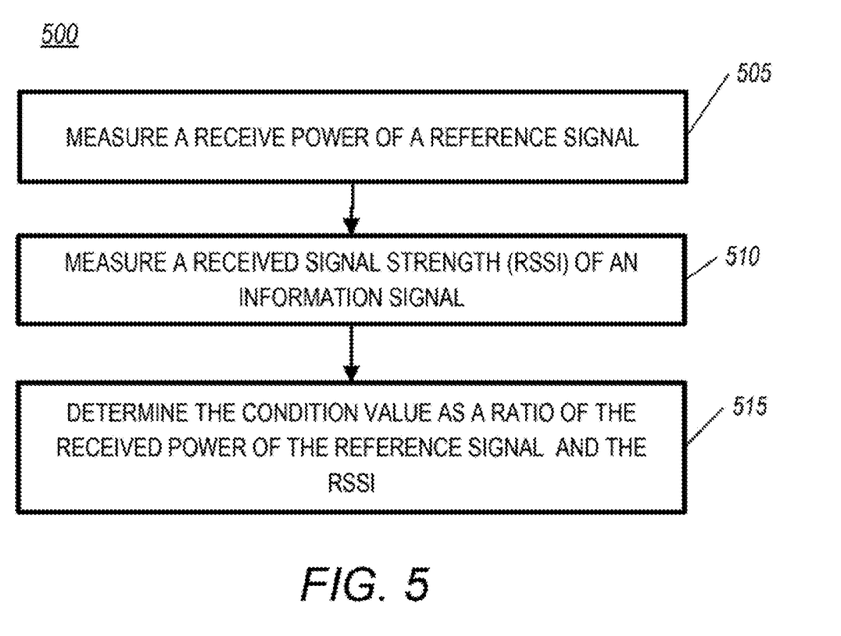

Referring to FIG. 5, a flow chart 500 shows some steps of the step 405 of determining the condition value described with reference to FIG. 4, in accordance with certain embodiments. At step 505, the received power of the reference signal is measured as described above with reference to FIG. 2. At step 510 a received signal strength (denoted as RSSI) is measured, using techniques defined in protocol specifications or commonly known techniques. At step 515 a normalized ratio of the two values is determined, wherein the normalization compensates for difference in the bandwidths of the signals from which the values were obtained. In an LTE system (as noted above) the received power of the reference signal is defined as RSRP. The condition value in an LTE system is defined as RSRQ, which is determined as N*RSRP/RSSI, wherein N is the normalization factor used to normalize the differing bandwidths of the signals used to determine RSRP and RSSI. The condition value can alternatively be expressed as $10^{(RSRQ_{dB}/10)}$.

Figure 6:
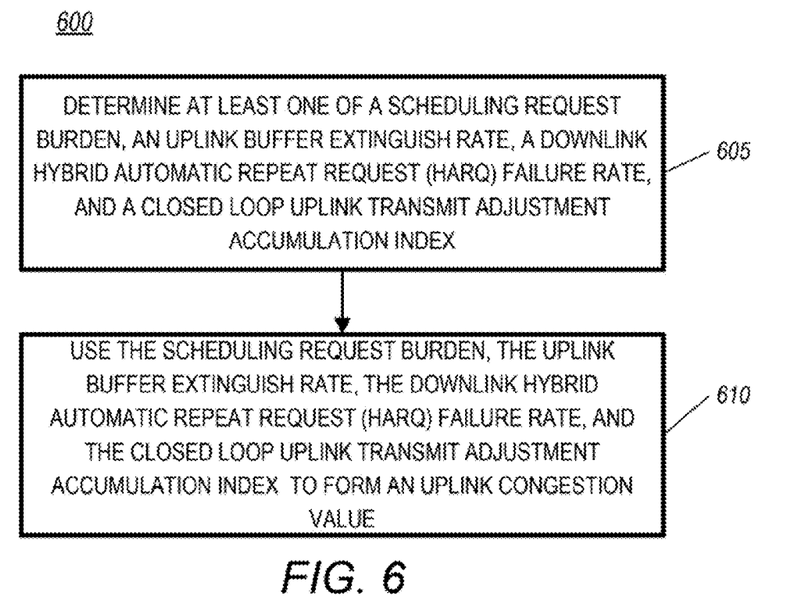

Referring to FIG. 6, a flow chart 600 show some steps of the step 210 (FIG. 2) described with reference to FIG. 2, in accordance with certain embodiments. At step 605, values of one or more characteristics of uplink congestion are determined. These uplink congestion characteristics are a scheduling request burden, an uplink buffer extinguish rate, a downlink hybrid automatic repeat request (HARQ) failure rate, and a closed loop uplink transmit adjustment accumulation index. At step 610, the values of these uplink congestion characteristics are combined to form the uplink congestion value. Computer simulation of the operation of user devices in LTE cells for various loading levels resulted in a determination of one or more thresholds for each of the uplink congestion characteristics that are used to generate a binary decision for each uplink congestion characteristics. When a determination is made by the user device that a particular uplink congestion characteristic is above (or below, as the case may be) its respective threshold, a non-zero binary weight is assigned to the respective uplink congestion characteristic; otherwise the respective uplink congestion characteristic binary weight is zero. The respective thresholds and the determinations of the values of each uplink congestion characteristic are described below. The non-zero binary weights for the scheduling request burden, the uplink buffer extinguish rate, the downlink HARQ failure rate, and the closed loop uplink transmit adjustment accumulation index are respectively 8, 4, 2, and 1. A combined uplink congestion value is then obtained by adding these together, resulting in a four bit binary uplink congestion value from 0 to 15. Details of this determination are provided further below.

Figure 7:
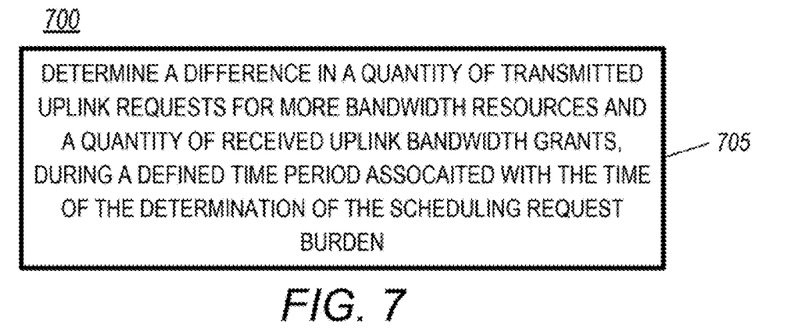

Referring to FIG. 7, a flow chart 700 shows a step 705 used in the step 605 described with reference to FIG. 6, in accordance with certain embodiments. As one example of determining the value of the uplink congestion characteristic of scheduling request burden at step 605 (FIG. 6), a difference in a quantity of transmitted uplink requests made by the user device for more bandwidth resources and a quantity of uplink bandwidth grants received by the user device is determined during a defined time period, such as 10 ms., associated with the time of the determination of the scheduling request burden. It will be appreciated that this resulting value is an integer typically greater than 1 and not more than 20. In LTE, "transmitted uplink requests made by the user device for more bandwidth resources" comprise uplink solicitations and uplink scheduling requests. "Uplink bandwidth grants received by the user device" are simply termed uplink grants in LTE. There are similar actions in other wireless systems. For example, similar terminology is used in UMB systems. In some embodiments, the scheduling request burden is converted to a binary value of 8 if the scheduling request burden is greater than or equal to 8 and zero otherwise.

Figure 8:
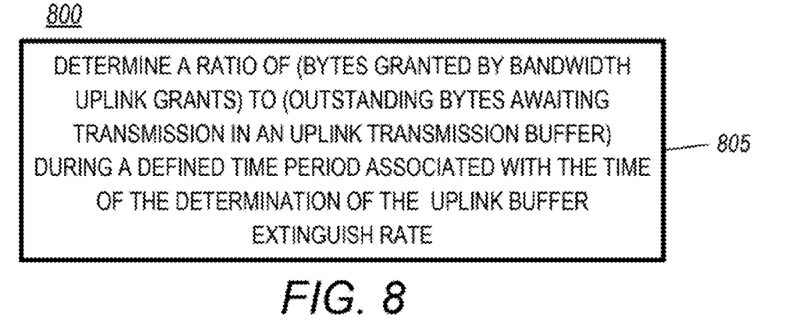

Referring to FIG. 8, a flow chart 800 shows a step 805 used in the step 605 described with reference to FIG. 6, in accordance with certain embodiments. As one example of determining the value of the uplink congestion characteristic of uplink buffer extinguish rate at step 605 (FIG. 6), a ratio of (bytes granted by uplink bandwidth grants) to (outstanding bytes awaiting transmission in an uplink transmission buffer) is determined during a defined time period, such as 10 ms., associated with the time of the determination of the uplink buffer extinguish rate. Parentheses were added in this statement to make clearer the items that are being described as the numerator and denominator of the ration. This time period is preferably the same as the time period described with reference to FIG. 7, but may vary by up to 50% without substantial impact on the results. Such variance may be a result of design choices made to improve programming resource efficiency (e.g., reduced memory usage or increased computational speed). It should be noted that the (bytes granted by uplink bandwidth grants) may comprise one or more byte rates that exist during the period. The one or more byte rates are multiplied by the time period if there is one byte rate during the period or multiplied by respective sub-time periods if there is more than one byte rate during the period. The quantity (outstanding bytes awaiting transmission in an uplink transmission buffer) is determined by calculating the average number of bytes awaiting transmission during the period. It will be appreciated that this value is in a range from 0.0 to a value greater than 1 that is theoretically limited by storage resources in the user device allocated for transmission buffering. The description "uplink bandwidth grants" is that used for LTE. The uplink bandwidth grants are conveyed in LTE using a DCI Format, but the term can be used to describe similar actions in other wireless systems. For example, similar terminology is used in UMB systems. In some embodiments, the uplink buffer extinguish rate is then converted to a binary 4 if the uplink buffer extinguish rate is less than or equal to 0.25 and zero otherwise.

Figure 9:
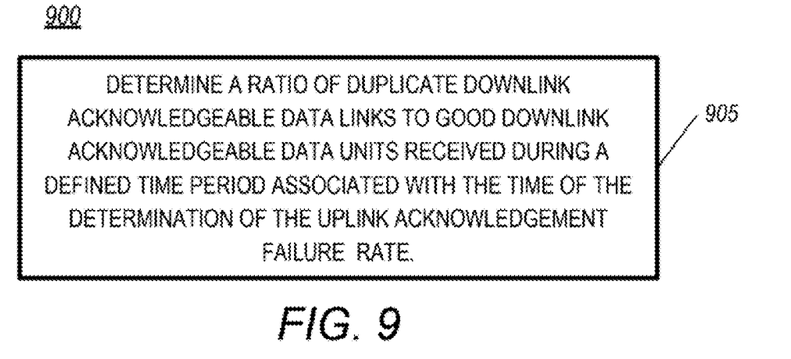

Referring to FIG. 9, a flow chart 900 shows a step 905 used in the step 605 described with reference to FIG. 6, in accordance with certain embodiments. As one example of determining the value of the uplink congestion characteristic of uplink acknowledgment failure rate at step 605 (FIG. 6), a ratio of duplicate downlink acknowledgeable data units to good downlink acknowledgeable data units is determined during a defined time period associated with the time of the determination of the uplink acknowledgment feedback failure rate. This time period is preferably the same as the time period described with reference to FIG. 7, but may vary by up to 50% without substantial impact on the results. Such variance may, for example, be a result of design choices made to improve programming resource efficiency (e.g., reduced memory usage or increased computational speed). It will be appreciated that this value is in a range from 0.0 to 1.0. In certain LTE embodiments the acknowledgeable data units are packets and the acknowledgments are HARQ acknowledgments, but other bases could be used. For example the acknowledgments could have other names in other systems and could occur at a higher system layer. In some systems, the data units could, for example, be described as messages, packets, or frames. In some embodiments, the acknowledgment failure rate is then converted to a binary 2 if the acknowledgment failure rate is greater than or equal to 0.5 and zero otherwise.

Figure 10:
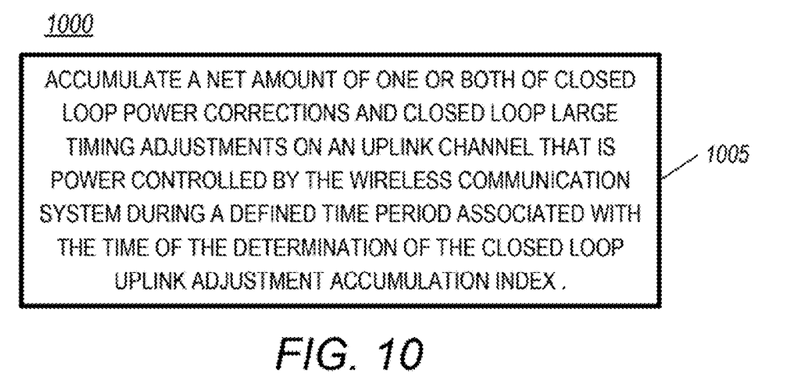

Referring to FIG. 10, a flow chart 1000 shows a step 1005 used in the step 605 described with reference to FIG. 6, in accordance with certain embodiments. As one example of determining the value of the uplink congestion characteristic of closed loop uplink transmit adjustment accumulation index at step 605 (FIG. 6), either a net amount of closed loop power corrections on an uplink channel that is power controlled by the wireless communication system is accumulated or a net quantity of timing adjustments on an uplink channel that is timing controlled by the wireless communication system is accumulated during a defined time period associated with the time of the determination of the closed loop uplink adjustment accumulation index. In some embodiments both power and timing values may be used, with a decision being based on one or both of the values. This time period is preferably the same as the time period described with reference to FIG. 7, but may vary by up to 50% without substantial impact on the results, and in some embodiments is 100 ms. Such variance may, for example, be a result of design choices made to improve programming resource efficiency (e.g., reduced memory usage or increased computational speed). In an LTE system, the power corrections and timing corrections are applied to transmission on one of the channels denoted as PUSCH or PUCCH. The power corrections are in dBm or are converted to dBm for the purpose of accumulation, so the net amount is in dBm. The closed loop uplink transmit adjustment accumulation index is then converted to a binary 1 if the net amount of closed loop uplink power corrections is greater than or equal to 6 dBm and zero otherwise. The net power threshold could be adjusted by +−2 dBm for other embodiments that provide similar benefits.

The timing corrections comprise either small-scale and/or large scale timing adjustments. In an LTE system and some other systems, the small-scale timing adjustments are closed loop timing corrections received in a 6 bit timing advance command. In an LTE system and some other systems, the large scale timing adjustment is accomplished in response a command that is received by the user device when the network concludes that the user device may have lost synchronization to an extent that correct synchronization cannot be corrected by normal incremental changes. In an LTE system the small-scale closed loop timing changes are accomplished by a timing correction command that uses a binary value of up to 63 to determine the correction. The large timing correction values are accomplished in response to a re-synchronization command and may result in an adjustment having a value of up to 1282. Both of these corrections use a common time unit which is multiplied by the binary value. In one embodiment, the user device accumulates small scale corrections. When the accumulation within a period of 100 ms exceeds a threshold that equates to 7 MAC (medium access control) timing units, the closed loop uplink transmit adjustment accumulation index is then set to a binary 1, otherwise it is zero. A similar approach based on a minimum timing correction can be used in other systems using MAC timing units as a basis for small timing corrections. Other threshold values may be used in some embodiments, such as values ranging from 5 to 9 MAC units, and these will provide similar benefits. When a re-synchronization command is received during a 100 ms period, the closed loop uplink transmit adjustment accumulation index is set to a binary 1. A similar approach can be used in other systems. It can be appreciated that in some embodiments, the closed loop uplink transmit adjustment accumulation index may set to a binary 1 by a power accumulation exceeding an accumulated power threshold or by a net small-scale timing adjustment exceeding an accumulated timing threshold, or by receiving a re-synchronize command, or any two or more of these exceeding their respective thresholds. These are just a few examples of the uplink congestion characteristic of closed loop uplink transmit adjustment accumulation index.

Figure 11:
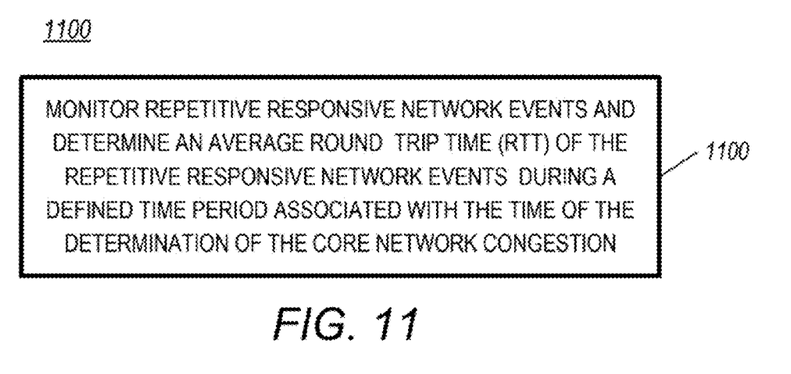

Referring to FIG. 11, a flow chart 1100 shows a step 1105 that may be used in the step 210 described with reference to FIG. 2, in accordance with certain embodiments. As one example of determining a core congestion value at step 210 (FIG. 2), an average round trip time (RTT) of a repetitive uplink responsive event is determined at step 1105 during a defined time period associated with the time of the determination of the closed loop uplink transmit power accumulation index. This time period is preferably the same as the time period described with reference to FIG. 7, but may vary by up to at least 50% without substantial impact on the results. Such variance may, for example, be a result of design choices made to improve programming resource efficiency (e.g., reduced memory usage or increased computational speed). The repetitive responsive event may be a transmission of a data unit by the user device occurring at the network layer or higher layer in a wireless network, wherein the network layer is one that can be analogized to the network layer defined in the open systems interconnection model defined in ISO/IEC 7498-1. For example, in a wireless communication system using internet protocol, the network layer may be termed the internet layer. The repetitive responsive event is the transmission of the data unit to the fixed network and the receipt of a response to the data unit from the fixed network, wherein in the data unit is one for which a response is expected to be initiated immediately upon receipt by the device in the fixed network which is responding. Examples of such data units are the ones used to perform a ping using the Internet Control Message Protocol at the internet layer of the Internet Protocol or an HTTP request and response messages using HTTP at the application layer of the internet protocol, or a datagram using the UDP protocol at the transport layer of the internet protocol, in which the datagram includes a request that is handled at the application layer to return a response through the datagram layer. In some embodiments, the core congestion value is then converted to a binary 0 if the RTT is less than or equal to 100 ms; to a binary 1 if the RTT is greater than 100 ms and less than or equal to 200 ms; to a binary 2 if the RTT is greater than 100 ms and less than or equal to 500 ms; and to a binary 3 if the RTT is greater than or equal to 500 ms.

Figure 12:
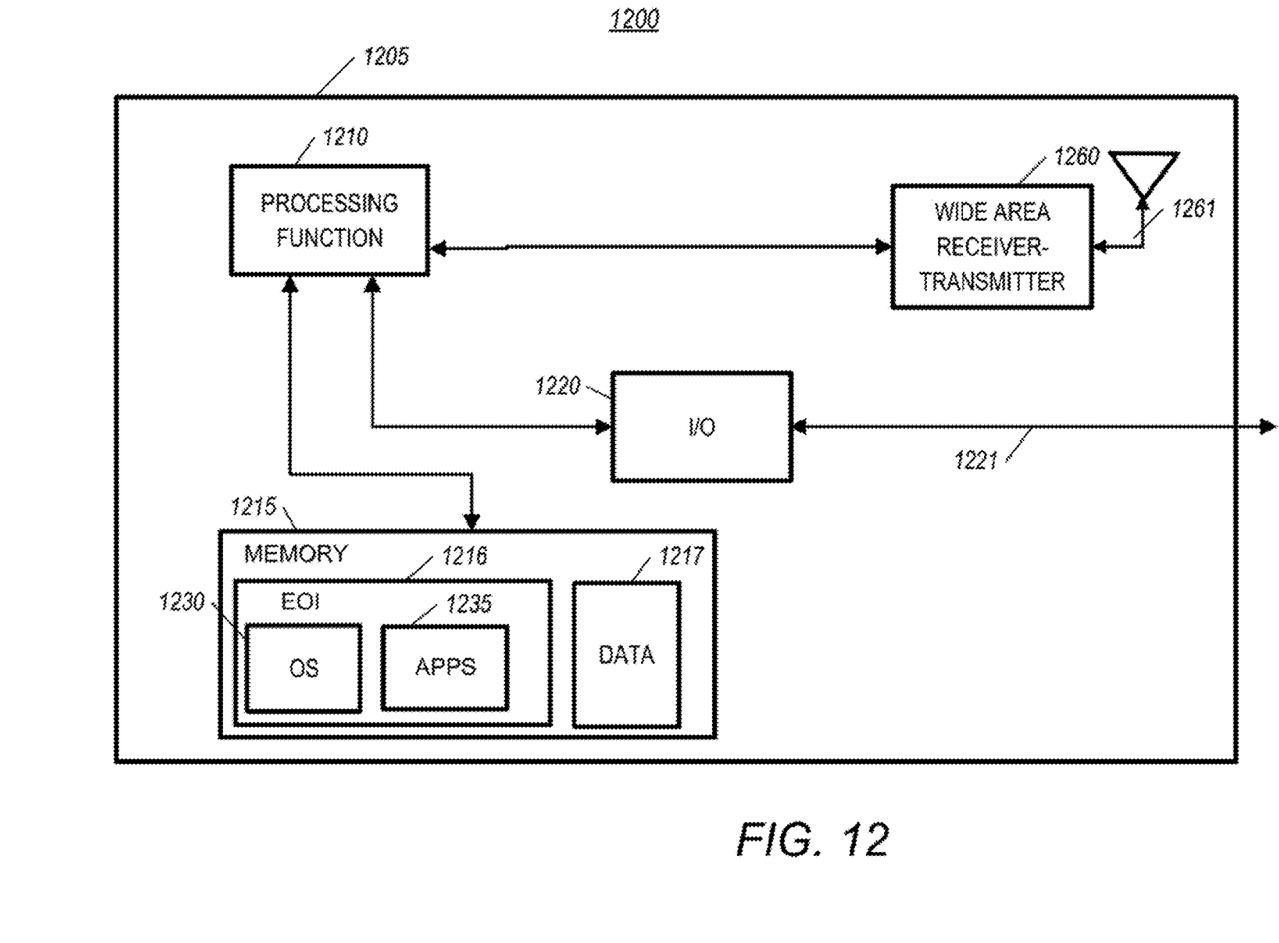
FIG. 12 is a block diagram that shows an apparatus block diagram of an electronic device that may be used in the wireless communication system described with reference to FIG. 1, in accordance with certain embodiments.

Referring to FIG. 12, a block diagram 1200 shows an apparatus block diagram of an electronic device 1205, in accordance with certain embodiments. Apparatus and functional aspects of the electronic device 1205 may exist in the user device 110 described herein above with reference to FIG. 1. The device 1205 includes a processing function 1210 comprising one or more processing devices, each of which may include such sub-functions as central processing units, cache memory, instruction decoders, just to name a few. The processing function 1210 executes program instructions which may be located within memory in the processing devices, or may located in a memory 1215 external to the processing function 1210, to which the memory 1215 is bi-directionally coupled, or in a combination of both. The program instructions that are executed may include, in certain embodiments, instructions for performing the method steps described with reference to flow charts shown in FIGS. 2 and 4-11. The processing function 1210 is further coupled to a wireless wide area network receive-transmit function 1260 that is coupled to a radio antenna 1261, which may be internal or external to the electronic device 1205. In some embodiments the wireless wide area network receive-transmit function 1260 itself comprises one or more processors and memory, and may also comprise circuits that are unique to radio protocols defined by an industry standard, and may referred to as a wide area receiver-transmitter. The wireless wide area network receive-transmit function 1260 in some embodiments is a cellular receiver-transmitter.

The apparatus block diagram 1200 shows the executable operating instructions (EOI) 1216 being stored in the memory 1215 external to the processing function 1210. The memory 1215 also stores data 1217. The EOI 1216 of the client device 1205 includes groups of instructions identified as an operating system (OS) 1230 and applications 1235. The combination of the processing function 1210 and the EOI 1216, or the processing function 1210, the EOI 1216, and the data 1217 is also referred to as the processing system of the electronic device 1205. The memory 1215 is herein termed "persistent memory", which comprises memory that is external to the processing function 1210 and excludes transient memory such as internal cache memory, registers, and processor stacks for which data that is being stored therein cannot be extracted by techniques that are non-invasive to the integrated circuits of the processing function 1210. The processing function 1210 may include input/output (I/O) interface circuitry and may be coupled to separate input/output interface circuitry 1220 that is controlled by the processing function 1210. The I/O 1220 provides for communications to hardware elements of the electronic device, such as keys, displays, and batteries, and to wired I/O 1221 such as that which uses standard hardware and software protocols (e.g., Universal Serial Bus, 1394, or Ethernet).

Figure 13:
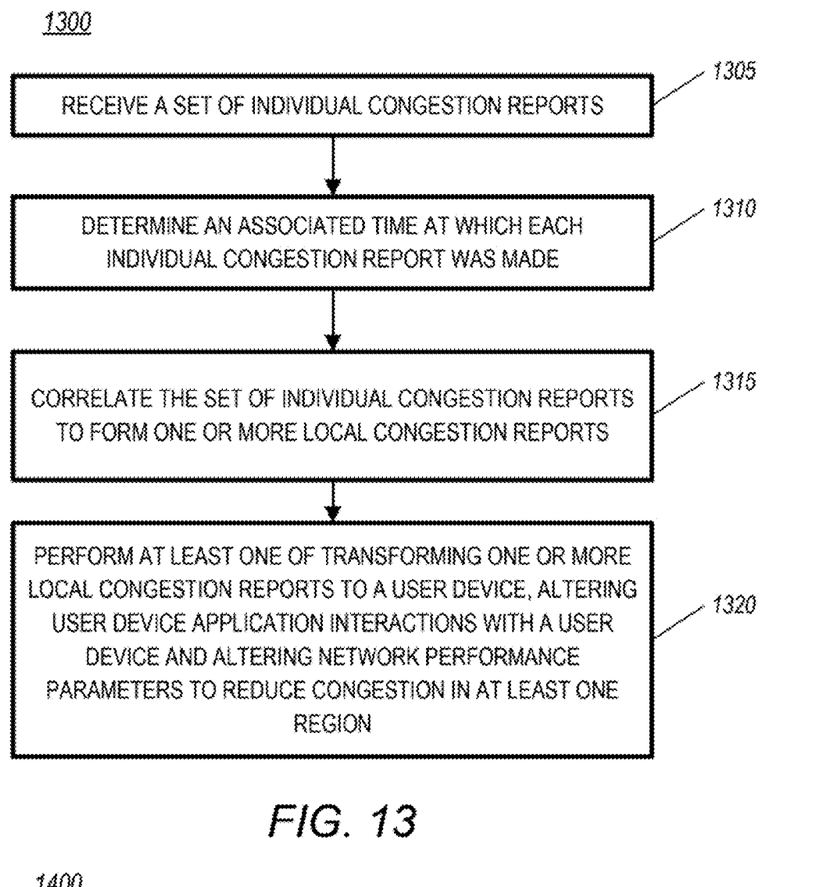
FIGS. 13-17 are flow charts that show some steps of a method performed in a wireless communication system, in accordance with certain embodiments.

Referring to FIG. 13, a flow chart 1300 shows some steps of a method for using individual congestion reports in a wireless communication system, in accordance with certain embodiments. The method may be performed at least partially in a fixed network of a wireless communication system, such as the fixed network described with reference to FIG. 1, or may be performed in the devices of a self organizing network. A base station of the wireless communication network and other fixed network devices comprise computing and radio devices that can perform some or all of the steps described herein. Certain steps may be performed in computing devices in a network coupled to the wireless communication system. Part of this method may be performed in a network that supplies application information to the used devices of the wireless communication network. Although certain of the steps and or combinations of the steps that are described herein are be unique, the programming of the network equipment is done using conventional programming equipment and techniques. It will be appreciated that certain details described elsewhere herein pertain to the steps of this method.

At step 1305 a set of individual congestion reports is received. Each individual congestion report comprises a set of congestion values and an associated location, as described herein above or variations thereof. Each individual congestion report has been transmitted by one of a plurality of user devices operating in the wireless communication system. An associated time at which each individual congestion report was made is determined at step 1310. As noted above, the time and the location may have been incorporated in the congestion report by a user device.

The set of individual congestion reports are correlated at step 1315 to form one or more local congestion reports. Each local congestion report has a summary congestion value that is determined from those individual congestion reports of the set of individual congestion reports that have associated locations and times that are within a geographic region (locale) and a time span of the local congestion report. It will be appreciated that a local congestion report may end up being formed from one individual congestion report when there is only one individual congestion report available within a maximum range allowed for a region. Multiple congestion reports may be correlated using, for example, the eight bit binary word described above with reference to step 215 of FIG. 2 and FIGS. 4-11, as well as the time and location of the congestion reports being correlated. In these embodiments, a combined value is obtained by adding together the binary values for the downlink congestion, the uplink congestion, and the core congestion and the correlation is done on the combined value, as well as the time and location using known correlation techniques. More complex known correlation techniques may be used in some embodiments that treat the downlink congestion, the uplink congestion, and the core congestion values as independent values. In some embodiments, one or more of the values may be ignored, which may provide benefits that are somewhat degraded from embodiments in which all the values are used. At step 1320 at least one of three actions is performed. The first action is transmitting one or more local congestion reports to a user device. The second action is altering user device application interactions with a user device based on the one or more local congestion reports, wherein the alteration is controlled by one or more network devices. The third action is altering network performance parameters to reduce congestion in at least on region based on one or more local congestion reports.

Figure 14:
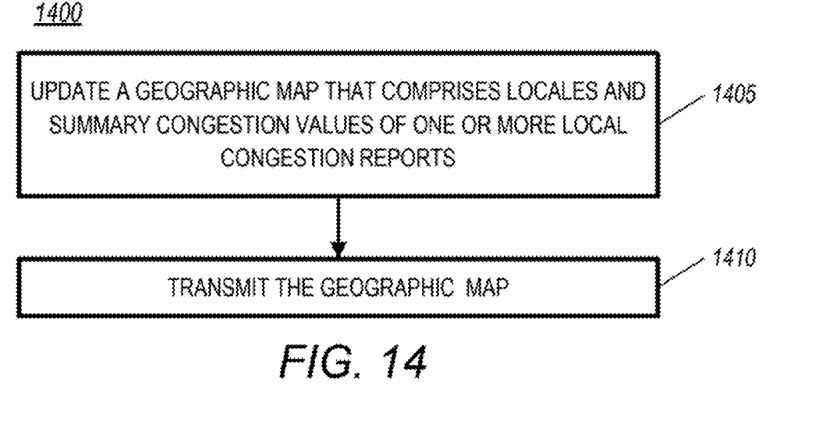

Referring to FIG. 14, a flow chart 1400 shows some steps that may be used in the step 1320 described with reference to FIG. 1300, in accordance with certain embodiments. As one example of transmitting one or more local congestion reports to a user device (step 1320 of FIG. 1300), a geographic congestion map that comprises the regions and summary congestion values of one or more local congestion reports is updated at step 1405. The congestion map is designed to be downloaded to a user device for presentation to the user of the user device. At step 1410, the map is transmitted to the user device. In some embodiments, the information in the local congestion report may be transferred from the wireless communication system to another system to be entered into the geographic congestion map (for example, it may be transferred to a Google system for entry into a Google map). The geographic congestion map may then be received by the wireless communication system for delivery to the user device. The user of the user device may advantageously use the congestion map. For example, the user may change a planned route to avoid areas of wireless communication system congestion to improve the reception of information during travels of the user. The user might also infer that the areas of wireless communication system congestion correlate with traffic congestion and may alter the user's route for that reason.

Figure 15:
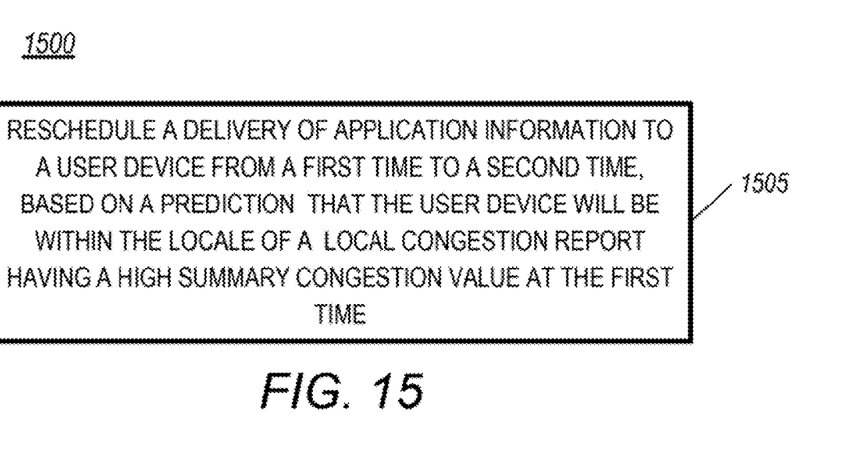

Referring to FIG. 15, a flow chart 1500 shows a step 1505 that may be used in the step 1320 described with reference to FIG. 13, in accordance with certain embodiments. As one example of altering user device application interactions with a user device based on the one or more local congestion reports (step 1320 of FIG. 1300), the delivery of application information to a user device is rescheduled by the network from a first time to a second time, based on a prediction that the user device will be within the locale of a first local congestion report having a high summary congestion value at the first time and will be in a locale of a second local congestion report that has a lower congestion value at the second time. In another example, the summary congestion value exceeds a delivery reliability limit at a time at which it is predicted that the user device will be at a first location, and the application information is time sensitive. For example, the application may be a navigation application having turn instructions, such that a turn instruction is needed at or before the first time. The application information scheduling is therefore changed from the first time to a second time that precedes the first time. In another example, a prediction of the location of the user device at the second time may not be in a location that is within the locale of any local congestion report; in which case the rescheduling is performed to deliver the information at a location where the summary congestion value is low, in order to improve the odds of getting the information to the user device.

Figure 16:
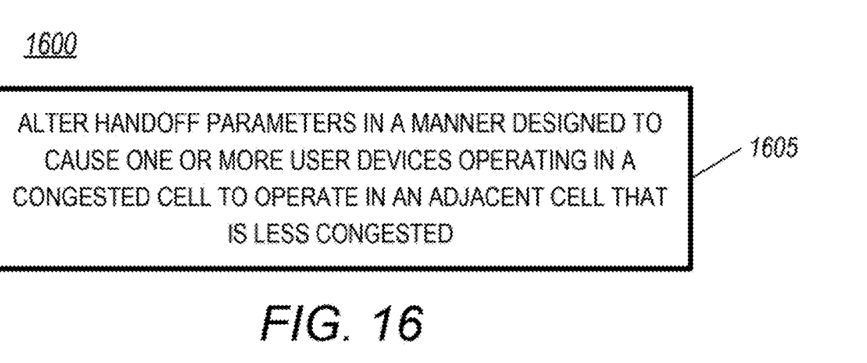

Referring to FIG. 16, a flow chart 1600 shows a step 1605 used in the step 1320 described with reference to FIG. 13, in accordance with certain embodiments. As one example of altering network performance parameters to reduce congestion in at least one region based on one or more local congestion reports at step 1320 (FIG. 13), handoff are controlled by the fixed network in a manner designed to cause user devices that would otherwise be operating in congested cells (without the information from the local congestion report) to operate in adjacent cells that are less congested. In another example of altering network performance parameters based on one or more local congestion reports, the system hardware design or system architecture of the wireless communication system is changed to alleviate congestion in locales where high congestion is consistently reported. For example, a new cell may be added.

Figure 17:
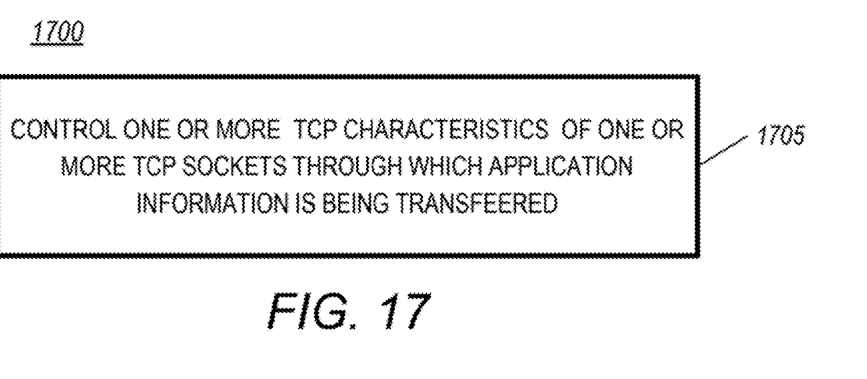

Referring to FIG. 17, a flow chart 1700 shows a step 1705 used in the step 225 described with reference to FIG. 1, in accordance with certain embodiments. In an example of using the congestion report to control information flow in the user device, one or more TCP (transmission control protocol) characteristics of one or more TCP sockets are controlled by the user device based on a congestion report. The TCP sockets are used for application information that is being transferred between the user device and one or more applications that are communicating with the user device through the wireless communication network. For example, the congestion report may be used by the user device to control the TCP socket window size of a TCP socket that a social application is using to transfer a picture. The application acts according to a selection by the user that extends the transmission time of the picture in order to reduce the cost to the user for using the wireless communication system resources to transmit the picture while operating in a congested region. This example may be extended to controlling all TCP sockets that the user device is employing simultaneously for several applications that are running concurrently. In another example, the retransmission trip timeout value (RTO) used in the protocol may be varied in response to the congestion report (i.e., increased when there is congestion). A description of an approach for maintaining the RTO is given in RFC (Request for Comments) 2998 issued in November 200 by the Network Working Group. One way to modify the RTO in conformance to the RFC 2998 is by modifying the clock granularity.

It should be apparent to those of ordinary skill in the art that for the methods described herein other steps may be added or existing steps may be removed, modified, combined, or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "coupled" as used herein is defined as connected, although not necessarily directly and not necessarily mechanically.

Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generating a congestion report by a user device operating in a wireless communication system, comprising:
    determining whether the user device is operating above a received signal congestion measurement threshold; and
    when the user device is operating above the received signal congestion measurement threshold,
        determining at least one of a downlink congestion value, an uplink congestion value, and a core congestion value,
        combining the determined at least one of the downlink congestion value, the uplink congestion value, and the core congestion value to form the congestion report, and
    performing at least one of
        transmitting the congestion report to a fixed network of the wireless communication system and
        using the congestion report to control information flow in the user device.

2. The method according to claim 1, further comprising, when the user device is not operating above the received signal congestion measurement threshold:
    sending a report indicating poor RF conditions.

3. The method according to claim 1, wherein the received signal congestion threshold is based on at least one of a signal to noise power ratio, a measured receive power of a reference signal, and a measured received signal strength of an information signal subject to interference from other user devices.

4. The method according to claim 1, wherein determining the downlink congestion value comprises:
    determining a condition value;
    determining a signal to noise power ratio; and
    determining the downlink congestion value based on the condition value and the signal to noise power ratio.

5. The method according to claim 4, wherein determining the condition value comprises:
    measuring a receive power of a reference signal; and
    measuring a received signal strength of an information signal.

6. The method according to claim 1, wherein the downlink congestion value in an LTE system is determined as:

$$(1/12)*10^{\wedge}(-RSRQ_{dB}/10)-10^{\wedge}(-SNR_{dB}/10).$$

7. The method according to claim 1, wherein determining the uplink congestion value comprises:
    determining at least one of a scheduling request burden, an uplink buffer extinguish rate, an uplink acknowledgment failure rate, and a closed loop uplink transmit adjustment accumulation index; and
    using the at least one of the scheduling request burden, the uplink buffer extinguish rate, the uplink acknowledgment failure rate, and the closed loop uplink transmit adjustment accumulation index to form the uplink congestion value.

8. The method according to claim 7, wherein determining the scheduling request burden comprises:
    determining a difference in a quantity of transmitted uplink requests for more bandwidth resources and a quantity of received uplink bandwidth grants during a defined time period associated with the time of the determination of the scheduling request burden.

9. The method according to claim 7, wherein determining the uplink buffer extinguish rate comprises:
   determining a ratio of (bytes granted by uplink bandwidth grants) to (outstanding bytes awaiting transmission in an uplink transmission buffer) during a defined time period associated with the time of the determination of the uplink buffer extinguish rate.

10. The method according to claim 7, wherein determining the uplink acknowledgment failure rate comprises:
    determining a ratio of duplicate downlink acknowledgeable data units to good downlink acknowledgeable data units received during a defined time period associated with the time of the determination of the uplink acknowledgment failure rate.

11. The method according to claim 7, wherein determining the closed loop uplink transmit adjustment accumulation index to form the uplink congestion value comprises:
    accumulating at least one of a net amount of closed loop power corrections and timing adjustments on an uplink channel, during a defined time period associated with the time of the determination of the closed loop uplink transmit adjustment accumulation index.

12. The method according to claim 1, wherein determining the core congestion value comprises:
    monitoring a repetitive responsive network event and determining an average round trip time (RTT) of the repetitive synchronous event during a defined time period ending with the time of the determination of the average RTT.

13. The method according to claim 1, wherein using the congestion report to control information flow in the user device comprises controlling one or more TCP (transmission control protocol) characteristics of one or more TCP sockets through which application information is being transferred between the user device and one or more applications that are communicating with the user device by means of the wireless communication network.

14. A wireless user device, comprising:
    a wide-area network receiver-transmitter; and
    a processing system coupled to the wireless network receiver-transmitter and the wide-area network receiver-transmitter, that provides functions comprising
        determining whether the user device is operating above a received signal congestion measurement threshold, and
        when the user device is operating above the received signal congestion measurement threshold,
            determining at least one of a downlink congestion value, an uplink congestion value, and a core congestion value,
            combining the determined at least one of the downlink congestion value, the uplink congestion value, and the core congestion value to form the congestion report, and
        performing at least one of transmitting the congestion report to a fixed network of the wireless communication system, and using the congestion report to control information flow in the user device.

15. The wireless user device according to claim 14, wherein the processing system, in order to cause the congestion report to control information flow in the user device, controls one or more TCP (transmission control protocol) characteristics of one or more TCP sockets through which application information is being transferred between the user device and one or more applications that are communicating with the user device by means of the wireless communication network.

* * * * *